United States Patent [19]

Gell, Jr.

[11] 4,198,635

[45] Apr. 15, 1980

[54] ORIENTATION SYSTEM

[76] Inventor: Harold A. Gell, Jr., 13720 Lockdale Rd., Silver Spring, Md. 20906

[21] Appl. No.: 865,140

[22] Filed: Dec. 28, 1977

[51] Int. Cl.² ............................................. G01S 5/02
[52] U.S. Cl. ............................. 343/112 PT; 33/324; 343/112 R; 350/331; 350/333
[58] Field of Search .............................. 343/112 PT; 350/331-333; 33/324

[56] References Cited

U.S. PATENT DOCUMENTS

| | | | |
|---|---|---|---|
| 4,060,910 | 12/1977 | Gell, Jr. | 33/324 |
| 4,064,919 | 12/1977 | Stern et al. | 350/331 X |

Primary Examiner—Maynard R. Wilbur
Assistant Examiner—Richard E. Berger
Attorney, Agent, or Firm—Harold Gell

[57] ABSTRACT

An orientation system adapted to be mounted within a vehicle, comprising a display including a rotational heading indicating compass card fabricated from an image retaining electronic display panel responsive to bearing data signals.

42 Claims, 11 Drawing Figures

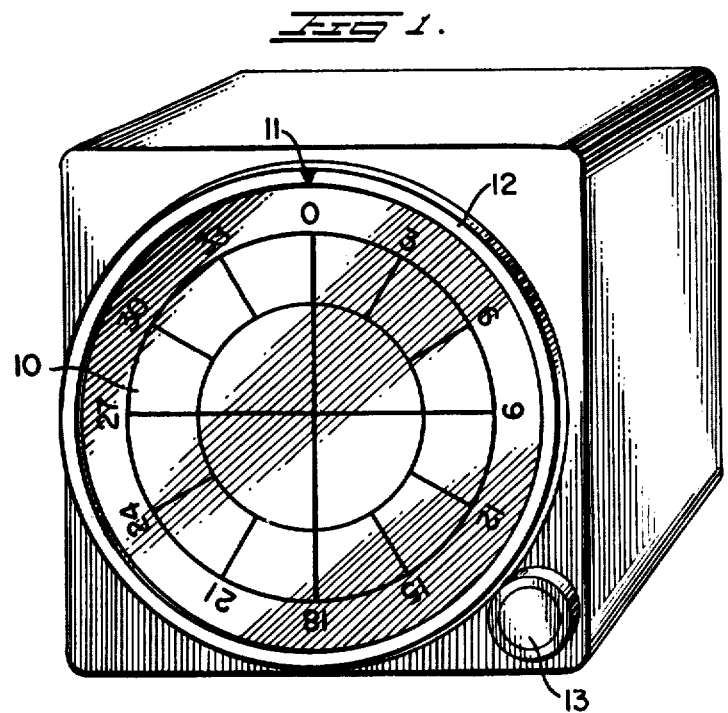
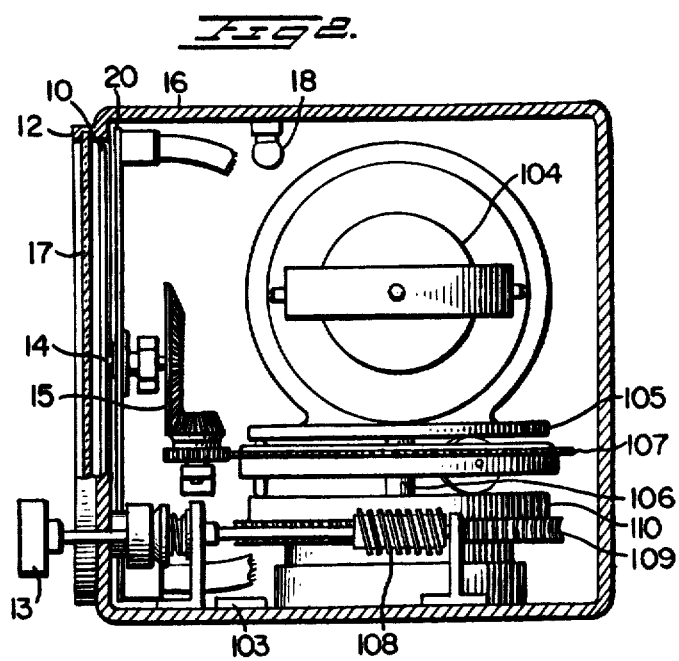

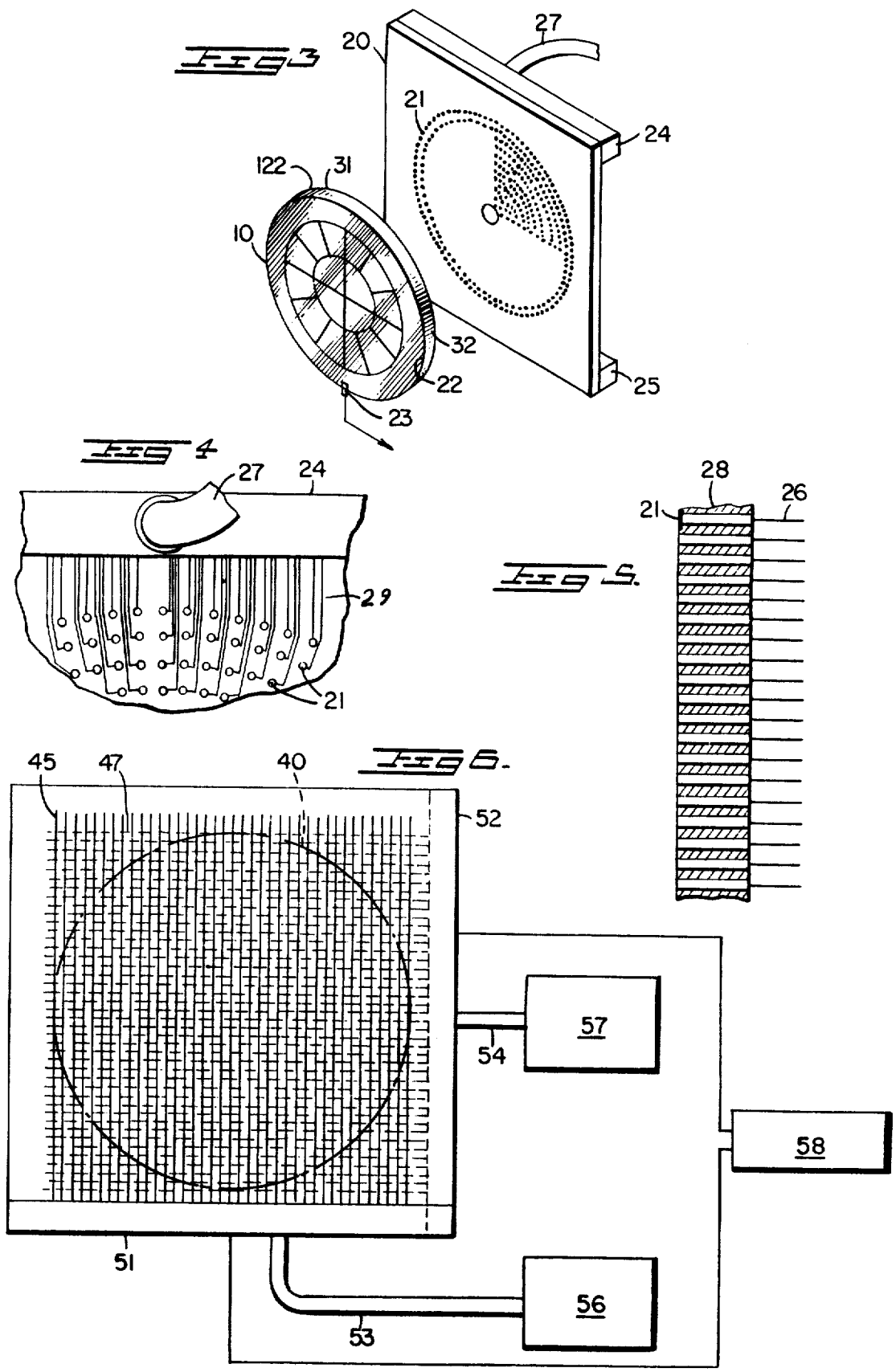

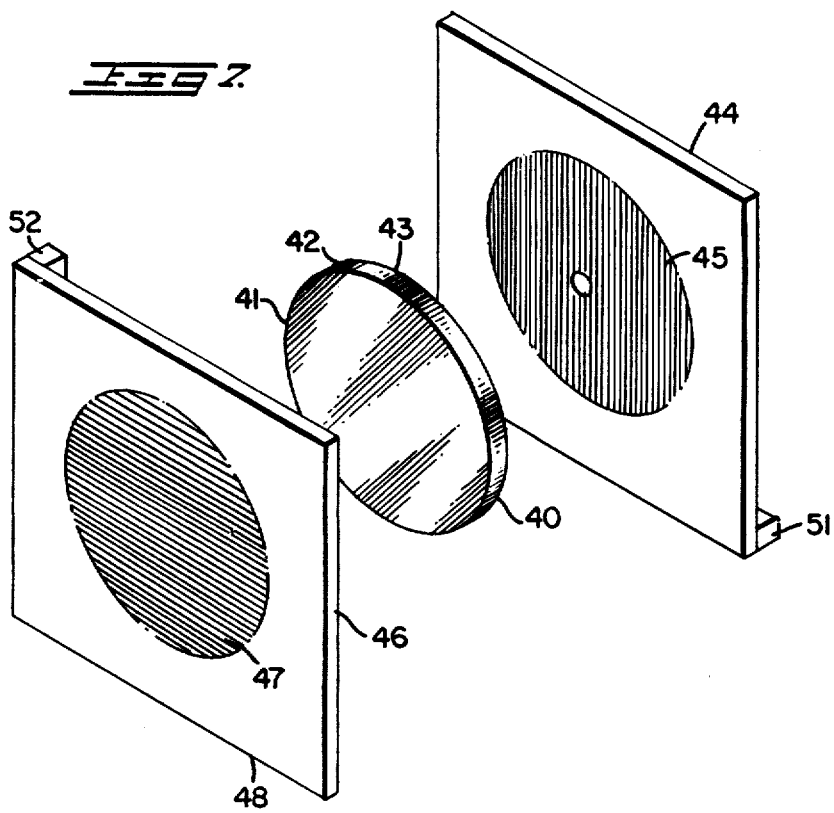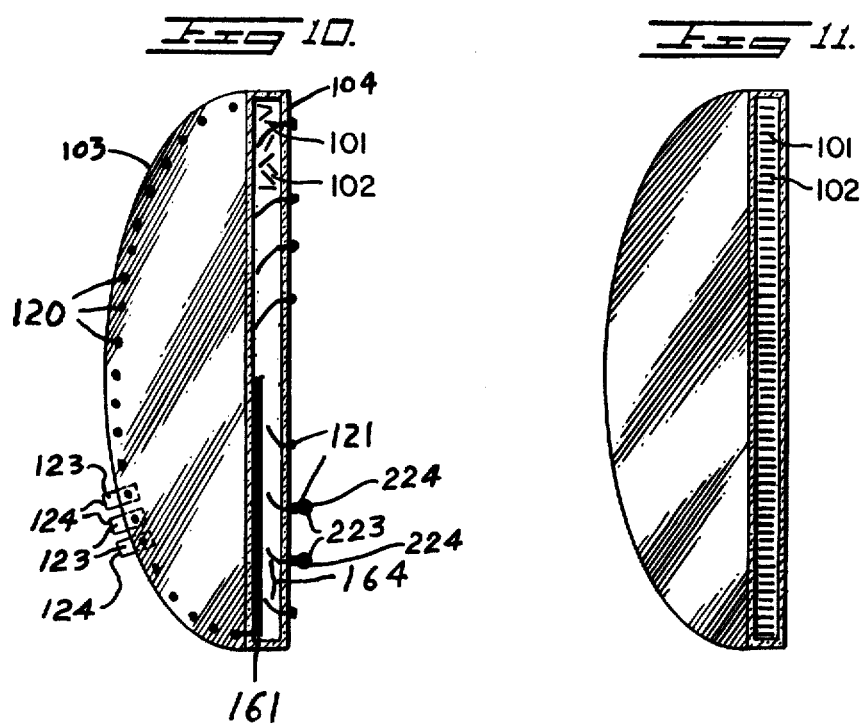

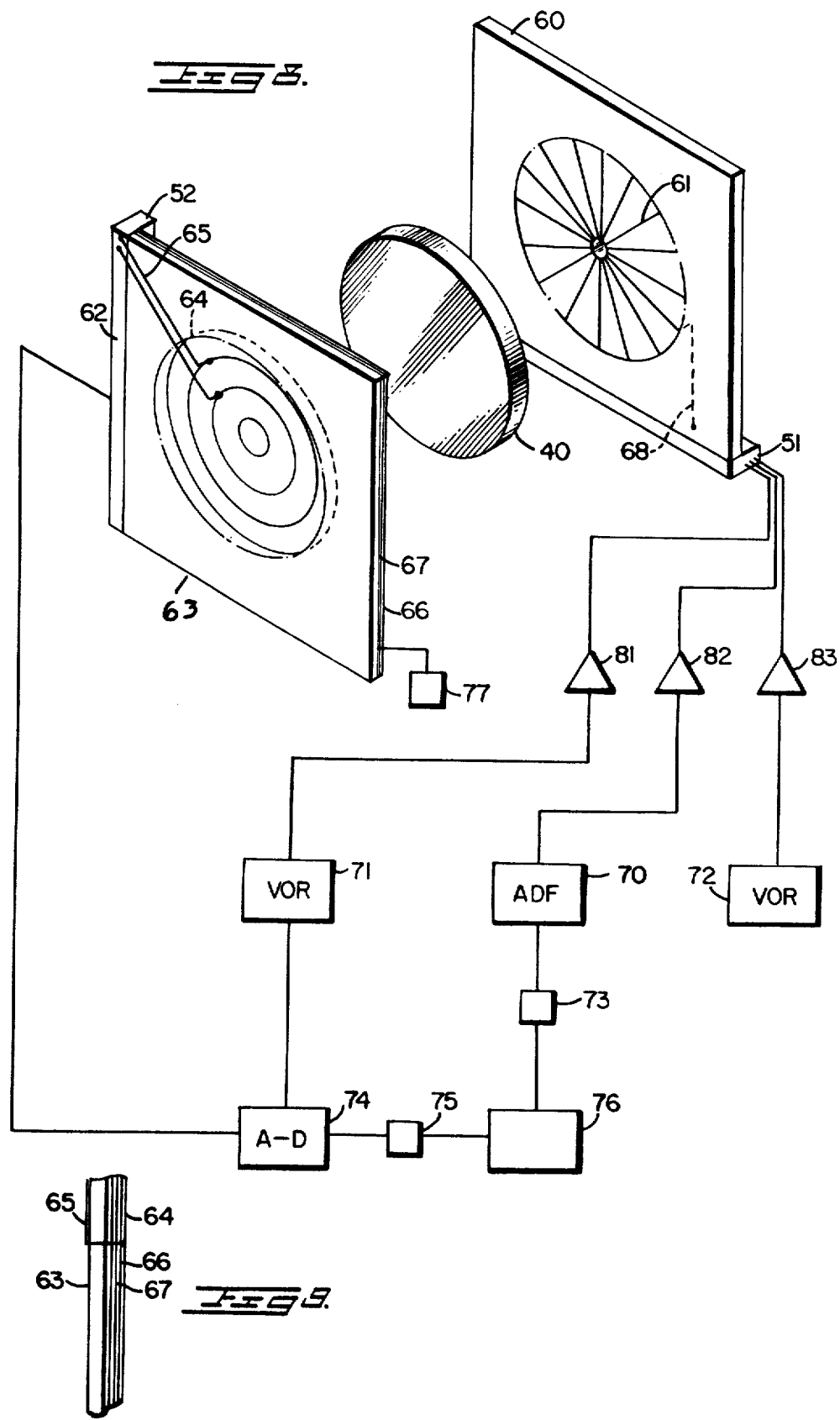

ORIENTATION SYSTEM

THE INVENTION

This invention relates to a means to provide bearing indications from a vehicle to a source of original or reflected radiation. It is a continuation of the inventive concepts presented in U.S. Pat. No. 4,060,910 on "Orientation System" issued Dec. 6, 1977 to Harold A. Gell, Jr.

BACKGROUND OF THE INVENTION

Modern technology has produced a wide variety of electronic devices adapted to indicate the bearing and distance of an object from a vehicle. Examples of relatively broad categories of such devices are radio direction finders, target tracking radars, storm cloud tracking radars and atmospheric disturbance detectors.

Radio direction finders generally incorporate a simple means to indicate bearing only except in the case of target identification transpondors. These latter systems function in cooperation with a rotatable antenna synchronized to a plan position indicator of PPI oscilloscope adapted to function similar to a tracking radar system except a transpondor is located in the target and adapted to provide a reply which is utilized by the system instead of a radar echo.

Radar systems using PPI displays have been used in vehicles such as aircraft for a significant number of years to indicate a large variety of items such as land mases, cities, other aircraft and areas of heavy precipitation. This latter application of radar systems commonly known as weather radar has found wide spread use in aircraft due to its ability to aid a flight crew in avoiding severe turbulence associated with thunderstorms.

A relatively newer approach to detecting severe turbulence associated with thunderstorms has recently been provided by systems combining radio receivers and plan position indicators wherein the radio receivers are responsive to the electromagnetic energy generated by lightning.

All of the foregoing systems utilize plan position indicators based upon cathode ray tubes which incorporate an electronically produced radial deflection in combination with an electromechanically produced rotational deflection of an electron beam. The rotational deflection or sweep of the beam is generally produced by rotating a deflection coil about the neck of a cathode ray tube in synchronization with a rotating or oscillating antenna. More recent technology has produced systems in which the target data is stored in computer means and displayed on the face of the cathode ray tube as a result of stationary electronic deflection means responsive to bearing related address data for the target data in storage.

All of the above plan position indicating devices have a serious drawback when used in a vehicle because the target data is the result of the instantaneous relative bearing at the time the signal is received. This vehicle heading oriented display remains fixed so that when the vehicle turns, the target image which has been retained fails to reflect the change in bearing from the vehicle. This results in enlarged and distorted targets and erroneous targets when high rates of turn are encountered.

In the atmospheric disturbance detection devices utilized to detect the presence of thunderstorms, the display means is usually a computer processed relative bearing indication on a cathode ray tube utilizing electronic deflection only. In these systems the display is a function of an automatic direction finding signal processed by a phase responsive antenna system. The received signals are retained in a storage means for a relatively long period of time when contrasted to normal radar return echos and used to generate a picture of severe weather cells. If the vehicle turns, the bearing data presented will be in error as a function of the amount of heading change of the vehicles since the last display update. This could be as much as 180 degrees in some instances and render the display completely useless.

OBJECTIVES OF THE INVENTION

In view of the obvious inability of the prior art display systems to indicate proper target bearing without complete updating of the display, it is a primary objective of the present invention to provide a plan position indicator which automatically maintains a true target relative bearing presentation even when the vehicle carrying the indicator is turning at a relatively high rate.

A further objective of the present invention is to provide a plan position indicator using a liquid crystal display element in the form of a compass heading indicating card.

A still further objective of the present invention is to provide a plan position indicator incorporating a dipolar electro-optic indicator in the form of a compass heading card.

A still further objective of the present invention is to provide a plan position indicator in the form of a compass card which has a capability of retaining target data in a display mode a relatively long duration of time.

It is a further objective of the present invention to provide an atmospheric disturbance indicator capable of storing and displaying disturbance incidents for a relatively long duration while maintaining proper relative bearing with respect to the individual incidents.

The foregoing and other objectives of the invention will become apparent in the light of the drawings, specification and claims contained herein.

SUMMARY OF THE INVENTION

Presented hereby is a plan position indicator incorporating a liquid crystal display means or a dipolar electro-optic display means on a rotatable, compass heading indicator card. The image generating light scattering materials contained on the rotatable card are activated by a grid of electrodes positioned behind the card and fixed with respect to the rotatable card housing or vehicle in which the device is mounted. Target signals activate individual electrodes essentially instantaneously as they are received to cause a target spot to appear on the card. As the vehicle turns that target spot will change in azimuth with respect to the vehicle as long as it is retained on the display.

The display materials utilized on the compass card are selected from liquid crystal compounds and dipolar electro-optic compounds adapted to have a relatively long image retention time.

DESCRIPTION OF THE DRAWINGS

FIG. 1 is a front ¾ view of a preferred embodiment of the present invention.

FIG. 2 is a side cutaway view illustrating a preferred embodiment of the present invention.

FIG. 3 is an exploded view of an indicator compass card and pin electrode assembly.

FIG. 4 is a sectional view of the electrical connection between individual electrode pins and the cable connector.

FIG. 5 is a sectional view of an electrode assembly.

FIG. 6 is a plan view of an alternate electrode assembly and functional control potential sources.

FIG. 7 is a front ¾ exploded view illustrating the front and rear electrodes and indicator compass card structure of a preferred embodiment.

FIG. 8 is a schematic representation of a preferred embodiment of the invention in combination with an exploded, front ¾ view of the principle elements comprising the invention.

FIG. 9 is a side cutaway view of the front electrode of the embodiment illustrated in FIG. 8.

FIGS. 10 and 11 are sectional views of an indicator compass card using dipolar elements.

DESCRIPTION OF THE INVENTION

FIG. 1 depicts a typical indicator incorporating the novel concepts of the present invention. The display 10 is a combined target indicator and compass card which incorporates indicia representing the cardinal compass points. Target indication is achieved by the card through its ability to alter its light scattering properties in response to an electric field stimulous. In the preferred embodiment, the card rotates to present the relative magnetic bearing under the indicating arrow 11 at the top of the front panel bezel 12 and due to this rotation, relative target azimuth is maintained. The card may be rotated by any means but preferably it is driven by a magnetic compass, gyrosyn compass or a gyro compass. For instance, the card 10 can be driven by the selysn receiver motor of a gyroscopically stabilized flux gate compass or remote indicating compass in which a magnetic compass rotates a selysn transmitter. A preferred embodiment, which will be discussed in the specification by way of explanation, utilizes a gyro compass mechanism to drive the indicator compass card 10. In this embodiment, knob 13 is provided to set the gyro compass heading indicator card 10 to the proper magnetic heading.

In the embodiment illustrated in FIG. 2 the indicator compass card 10 is rigidly affixed to shaft 14 which couples the card to the gyroscopic rotating mechanism via gear train 15. The illustrated gyroscopic mechanism is presented as exemplary only and may be any one of the numerous types available. The gyroscope 104 of the gyrocompass device of FIG. 2 is supported by a base 105 which is essentially parallel to a plane tangent to the surface of the earth. The base 105 is supported on a shaft 106 which permits the gyroscope to rotate freely with respect to the case 16 and 360 degrees about an axis perpendicular to the plane tangent to the earths surface. When the gyroscope 104 is spun up it will remain fixed with respect to the perpendicular axis so that relative rotation between the case 16 and base 105 will occur when the case is rotated, as it would be if fixed in the instrument panel of a turning aircraft. A gear 107 is attached to the base 105. It is adapted to drive gear train 15 which rotates the indicator 10. The worm gear 108 cooperates with gear 109 on the support base 110 which supports shaft 106 so that when knob 13 is turned, it will alter the relationship between the gyroscope heading and indicator position.

Positioned immediately behind the rotatable card 10 is an electrode assembly 20 which is rigidly affixed to the indicator case 16. A transparent glass or plastic lens 17 is positioned in the bezel 12 and over the indicator compass card 10 to protect the card and keeps foreign matter out of the assembly. A light 18 is located inside the indicator case 16 to provide target illumination via light transmission through selected portions of the indicator compass card 10.

One form of electrode assembly 20 and indicator compass card 10 is illustrated in an exploded view in FIG. 3. This electrode assembly is comprised of a plurality of electrode pins 21 in a circular arrangement adapted to permit a relatively uniform display presentation by generating an electric field between selected pins 21, through the indicating material of indicator compass card 10, and a transparent electrode 22 covering the front face of indicator compass card 10. Ground potential or other required operating voltage is maintained on transparent electrode 22 via a shoe contact 23. The spacing between electrode pins 21 is relatively constant but may be slightly greater around the outer periphery of the electrode assembly as required to permit electrical connection of the pins to target data input cable connectors 24 and 25.

The electrode pins 21 are in the form of short pins as illustrated in FIGS. 4 and 5 which may be tied directly to individual conductors 26 that are then combined to form cables 27 coupling the electrode assembly to a target signal processing means. The length of the pin electrodes 21 is selected so that the wires connecting the pins to the signal processing source are spaced apart from the indicator compass card a distance great enough so that any electric fileds they may create will have no effect thereon. The pins may be placed in a relatively thick material forming the electrode support or they may be supported between two thin sheets of dielectric material. In a preferred embodiment a single thick sheet 28 of dielectric material is utilized having a thickness equal to the length of the pins 21 and the pins are headed at the display side to create a larger image.

A preferred form of the invention utilized printed wiring 29 to connect the individual pins 21 to the cable receptacles 24 and 25 at the sides of the electrode assembly 20, see FIGS. 3 and 4. This technique is preferred because extremely fine printed wires or conductors may be utilized and because of their thin dimensions they may be placed relatively close to the indicator compass card 10 without creating display interfering electric fields and erroneous targets.

The indicator compass card 10 of FIG. 3 is comprised of a dielectric support member 31 and a transparent conductive electrode adapted to form a hollow disc which is filled with a liquid crystal display compound 32. In operation, an electrostatic field is set up between energized electrodes and the transparent conductive electrode causing the liquid crystal display element to alter its light scattering properties so that ambient light or light from a lamp directed on the front of the indicator compass card will create a visible image. In an alternate embodiment, light source such as 18 of FIG. 2 may be placed within the housing 16 and the support dielectric base 31 of FIG. 3 can be fabricated from a translucent material so that target images are formed by the process of selectively permitting light to pass through the indicator compass card.

The liquid crystal display compound 32 may be a cholesteric or nematic liquid crystal similar to those listed in Table 1 or a mixture of a cholesteric liquid crystal compound with a nematic liquid crystal compound of the type that exhibits a non-destructive turbulent motion when an electrical current of sufficient magnitude is passed therethrough. An example of such a material is presented in U.S. Pat. No. 3,703,331 on "Liquid Crystal Display Element Having Storage"issued to J. E. Goldmacher et al, on Nov. 21, 1972. As suggested by that patent, the ratios and types of cholesteric and nematic liquid crystals are controlled to provide a display element having the required image retentivity. For atmospheric disturbance presentations this time may be in the order of two minutes.

Table 1

Nematic Liquid Crystals p-azoxyanisole
p-azoxyphenetole
p-butoxybenzoic acid
p-methoxycinnamic acid
butyl-p-anisylidene-p-aminocinnamate
anisylidene
para-aminophenylacetate
p-ethoxybenzylamino-a-methylcinnamic acid
1,4-bis(p-ethoxybenzylidene)cyclohexanone
4,4'-dihexyl-oxybensene
4,4'-diheptyloxybenzene
anisal-p-amino-azo-benzene
anisaldazine
a-benzeneazo-(anisal-a'-naphthylamine)
n,n'-nonoxybenzetoluidine
p-n-anisylidene-p'-aminophenylacetate
p-n-butoxybenzoic acid dimer
p-n-butoxybenzylidene-p'-aminophenylacetate
p-n-octoxybenzylidene-p'-aminophenylacetate
p-n-benzylideneacetate-p'-aminophenylethoxide
p-n-anisylidene-p'-aminophenylbutyrate
p-n-butoxybenzylidene-p'-aminophenylpentanoate
p-n-hexoxybenzylidene-p'-aminophenylacetate
p-iso-pentoxybenzylidene-p'-aminophenylacetate
p-n-benzylidenebutyrate-p'-aminophenylmethoxide
p-n-benzylidenebutyrate-p'-aminophenylhexoxide
p-n-nonoxybenzylidene-p'-aminophenylacetate
p-n-anisylidene-p'-aminophenylpentanoate
p-n-propoxybenzylidene-p'-aminophenylacetate
p-n-propoxybenzylidene-p'-aminophenylbutyrate
p-n-benzylidenebutyrate-p'-aminophenylpropoxide
p-n-benzylideneacetate-p'-aminophenylmethoxide
anils of the generic group p-n-alkoxybenzylidene-p-n-alkylanilines), such as p-methoxybenzylidene-p'-n-butylaniline; nematic compounds of the alkoxybenzylidene-aminoalkylphenone group, such as methoxybenzyl-idene-amino-butyrophenone and methoxybenzylidene aminovalerophenone; mixtures of the above and others.

Cholesterol Derivatives and Cholesteric Liquid Crystals

Cholesteryl Chloride
Cholesteryl Bromide
Cholesteryl Iodide
Cholesteryl Nitrate
Esters derived from reactions of cholesterol and carboxylic acids
For example Cholesteryl Crotonate
Cholesteryl Nonanoate
Cholesteryl Hexanoate
Cholesteryl Formate
Cholesteryl Chloroformate
Cholesteryl Propionate
Cholesteryl Acetate
Cholesteryl Valerate
Cholesteryl Linolate
Cholesteryl Linolenate
Cholesteryl Oleate
Cholesteryl Erucate
Cholesteryl Butyrate
Cholesteryl Caprate
Cholesteryl Laurate
Cholesteryl Myristate
Ethers of cholesterol such as
Cholesteryl Decyl Ether
Cholesteryl Oleyl Ether Table 1-continued Cholesteryl Dodecycl Ether
Carbamates and carbonates of cholesterol such as
Cholesteryl Decyl Carbonate
Cholesteryl Oleyl Carbonate
Cholesteryl Methyl Carbonate
Cholesteryl Ethyl Carbonate
Cholesteryl Butyl Carbonate
Cholesteryl Docosonyl Carbonate
Cholesteryl Heptyl Carbamate
and alkyl amides and aliphatic secondary amines derived from 3β-amino-Δ⁵-cholestene and mixtures thereof
peptides such as poly-γ-benzyl-1-glutamate
derivatives of beta sitosterol such as sitosterol chloride
and active amyl ester of cyano benzylidene amino cinnamate
Stigmasterol
Cholesteryl Palmitate
Cholesteryl Decanoate
Cholesteryl Laurate
Cholesteryl Propionate
Cholesteryl Heptafluorobutyrate
Cholesteryl 2-Furoate
Cholesteryl Cinnamate
Cholesteryl Cyclohexanecarboxylate
Cholesteryl Anisoate
Dicholesteryl Phxhalate
Cholesteryl p-Nitrobenzoate
Cholesteryl p-Phenylazobenzoate
Cholesteryl 3,5-Dinitrobenzoate
Cholesteryl 2-(Ethozyethoxy) Ethyl Carbonate
Cholesteryl 2-(2-Methoxyethoxy) Ethyl Carbonate
Cholesteryl Geranyl Carbonate
Cholesteryl Octadecyl Carbonate
Cholesteryl 2-Propyn-1-yl Carbonate
Cholesteryl 2-Methyl-2-propene-1-yl Carbonate
Allyl Cholesteryl Carbonate
Cholesteryl 2,2,2-Trifluoroethyl Carbonate
Cholesteryl Methyl Carbonate
Cholesteryl Cinnamyi Carbonate
Cholesteryl p-Menth-1-en-8-yl Carbonate
Cholesteryl Nitrate
Cholesteryl Propynyl Carbonate
3β-Chlorocholest-5-ene
Cholesteryl Methanesulfonate
5α-Choiestan-3β-yl Chloroformate
Cholesteryl Chloroformate
5α-Cholestan-3β-ol The alkyl groups in the above compounds are typically saturated or unsaturated fatty acids, or alcohols, having less than about 25 carbon atoms and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline films in the advantageous system of the present invention.

An alternate embodiment of the invention is illustrated in FIGS. 6 and 7 where in the indicator compass card 40 includes display material 42 contained between two members 41 and 43 and the rear electrode 44 is comprised of a parallel grid of conductors 45. A second electrode 46 is located in front of the rotatable display element 40 and it is comprised of a plurality of parallel, transparent conductors 47 on a transparent substrate 48 oriented so the conductors 47 are perpendicular to the conductors 45 of the rear assembly 44. The electrodes are connected via cable connectors 51 and 52 and cables 53 and 54 to signal processing means 56 and 57 which are adapted to address individual vertical and horizontal electrodes to create an image at a predetermined point on the rotating imaging assembly. This embodiment has certain advantages over the previously discussed embodiment for it requires fewer electrical connections to the display generating means and simplifies the addressing electronics.

An erase assembly 58 comprised of a power supply and a switching means is attached to electrodes of the assemblies to permit automatic and selective erasure of the display. Alternately, erase electrodes may be included in any embodiment. For instance in the embodiment illustrated in FIG. 3 the erase electrodes are transparent electrode 22 and a second transparent electrode 122 on the opposite side of the compass indicator card 10 electrically connected to the power source via a shoe contact similar to 23. If desired, the erase electrodes can be mounted on the fixed electrode assemblies to eliminate the need for shoe contacts. This is the preferred form since the imaging conductors can be placed between the erase electrodes and the compass indicator card 10 to prevent the erase electrodes from interfering with the image generating process.

The signal processing means 56 and 57 of FIG. 7, or of any embodiment, couple electrical impulses from a signal generating source to the display creating electrodes. The signal generating source may be a radar receiver of the type adapted to provide target data display signals having display coordinates, or it may be a television video signal generator with the sweep scan synchronized to the horizontal conductor pattern of electrode assembly 47 and digitizing signals synchronized with segments of the horizontal sweep impressed on the vertical conductor pattern of electrode 46, or it may be a radio direction finder and signal processing unit such as the Ryan Stormscope WX-7 manufactuted by ((Ryan)))) Stormscope, 4800 Evanswood Drive, Columbus, Ohio, 43229 which is capable of receiving electromagnetic radiation disturbances generated by lightning and processing the received signals using radio direction finding techniques so that the disturbance targets will have an azimuth and distance quality.

In a preferred form of the instant invention illustrated in FIG. 8, a rear electrode 60 incorporates a plurality of radiating conductors 61 which are electrically connected by leads 68 to cable connector 51. The number of radiating conductors is a function of the dimensions of the conductor and electrode assembly but preferably the number of conductors is a multiple of 36. The front electrode assembly 62 is comprised of a transparent, dielectric substrate 63 upon which closely spaced circular, transparent conductors 64 are positioned on the side adjacent to the rotatable indicator 40. The transparent, circular conductors 64 are connected to cable connector 52 by means of transparent connectors 65 which pass through the substrate 63 and traverse the side of the substrate opposite the side upon which the circular conductors are positioned. The dielectric substrate 63 is dimensioned so that connectors 65 are maintained a sufficient distance from the rotatable indicating means 40 so that they will not generate electric fields that will influence the rotatable display element 40, A thin, transparent dielectric substrate 66 may be positioned between substrate 63 and conductors 64 to insulate the circular electrodes or conductors 64 from a conductive, transparent sheet 67 positioned over dielectric substrate 63 to form an erasing electrode. This forms a front electrode assembly which is comprised of a sandwich having a primary supporting dielectric body 63 with connection conductors 65 on the front side and a conductive layer 67 on the back side covered by a dielectric layer 66 which in turn is covered by circular electrode conductors 64, see FIG. 9.

The individual ray like conductors 61 on electrode assembly 60 are connected via conductive connectors 68 and cable connector 51 to an automatic direction finder receiver 70. The analog data normally used to drive a direction indicating meter is digitized, by any one of the acceptable standard methods well known in the art, to provide a number of inputs adapted to match the number of ray conductors 61 on electrode assembly 60.

Signals detected by visual omnirange (VOR) receivers 71 and 72 are digitized by one of the standard conversion techniques such as that utilized in the VOR/100 digital VOR radial display manufactured by HTI, Redwood Avenue, Los Angeles, California, 90066 or the Bendix PX2000 Navigation System manufactured by the Bendix Corporation, Avionics Division, P.O. Box 9414, Ft. Lauderdale, Florida, 33310 to provide a number of azimuth outputs corresponding to the number of ray electrode conductors 61 of electrode assembly 60.

The signals detected by the ADF are also applied to a discriminator 76 which includes a band pass filter adapted to pass signals of a predetermined frequency range corresponding to the electromagnetic radiation generated by lightning. The output of the discriminator 76 is applied to an analog to digital converter 74 which converts the signals received from the discriminator to a plurality of digital outputs corresponding to the number of electrode conductor rings 64 on electrode assembly 62. This interconnection is arranged so that the strongest signal will energize the smallest ring electrode at the center of the electrode assembly 62 and the weakest signal will energize the largest circular electrode 64 to provide a range indication. A variable attenuation pad 75 is positioned between discriminator 76 and analog-to-digital converter 74 so that the amplitude of the signal applied to the analog-to-digital converter may be adjusted to cause the concentric ring electrodes 64 to represent signals at predetermined ranges. An amplification network 73 is positioned between the ADF receiver and the analog-to-digital converter so that the effective range of the device may be set to predetermined ranges such as 0 to 10 miles, 0 to 20 miles, 0 to 100 miles, 0 to 200 miles, etc.

Signal strength controlling means such as amplifiers or attenuation means 81, 82 and 83 are provided between the VOR receivers 71 and 72 and ADF receiver 70 and the electrode assembly 60 so that an operator may cause signals from a specific receiver to be of a greater amplitude and thus create a brighter display or conversely have a lesser amplitude and create a dimmer display.

The conductive sheet electrode 67 of electrode assembly 62 is energized by function selection control 77 which is adapted to apply a constant operating potential to the electrode and thus mask out any effects which might be created by circular electrode conductors 64 or in an alternate mode of operation energization means 77 will produce no operating potential for conductor 67 and thus only targets representing atmospheric electrical discharge will be created on the display means 40. In a third mode of operation, control means 77 provides regular, intermittent activation pulses to electrode 67 so that VOR and ADF data will be displayed as ray lines corresponding to electrodes 61 and atmospheric disturbance data will be alternately displayed as target points where energized circular electrodes 64 correspond with energized ray electrodes 61. In this mode of operation the pilot of an aircraft will have a single display which will indicate relative bearing to two different VOR stations and an ADF station in combination with point targets representing atmospheric disturbances. The operator may, through the signal strength controlling means 81, 82 and 83 vary the intensity of the VOR and ADF azimuth indicating rays so that he may easily distinguish therebetween.

In the preceeding embodiments of the present invention, the liquid crystal display element may be replaced with a dipolar electro-optic structure such as those structures disclosed in U.S. Pat. No. 3,512,876 on "Dipolar Electro-Optic Structures" issued to A. M. Marks, May 19, 1970. This display element is comprised of a plurality of small dipolar elements 101 suspended in a liquid 102 as indicated in FIGS. 10 and 11. The dipolar elements 101 are normally randomly oriented as indicated in FIG. 10, but an electric field is generated between two electrodes as in the previous embodiments and it causes the dipolar elements to align themselves as illustrated in FIG. 11, thus altering the light scattering properties of the material. When this display medium is utilized, the image retentivity is controlled by selecting the viscosity of the liquid in which the dipolar elements are dispersed. The heavier the liquid the greater the duration an image will be retained. This is controlled in a preferred embodiment by the controlled application of heat through heater 103 of FIG. 2 to vary the liquid viscosity.

The dipolar elements 101 are, in a preferred embodiment, minute particles having one dimension in the order of $\lambda/2\eta$ and a perpendicular dimension equal to or less than $\lambda/10\eta$ where $\lambda$ is the wavelength of light and $\eta$ is the index of refraction of the suspending medium.

The displayed targets are erased in the dipolar embodiments by using an alternating current erase signal similar to that used in the liquid crystal embodiments.

The various embodiments presented herein may be altered to form embodiments capable of functioning at much lower electrical potentials by incorporating both front and back electrode assemblies in the rotating, display means 10 or 40 of FIGS. 2, 3, 6, 7 and 8. When this approach is used, the electric field responsive substance is contained within an indicator having front and back dielectric plates similar to that illustrated in FIG. 10. The front plate, 103 is formed of a transparent material and supports a plurality of electrodes 161 which are located on the interior surface of the plate and in direct contact with the electric field responsive indicating medium. The electrodes 161 may be in the form of rays similar to electrodes 61 of FIG. 8 or they may be in the shape of any of the other electrode configurations previously suggested. The electrodes 161 are electrically connected to individual contact pads 120 which are adapted to contact a plurality of shoes or electrical brushes 123 similar to shoes 23 of FIG. 3. The number of contact shoes 123 provided is equal to the number of contact pads 120. The shoes are held relatively stationary with respect to the indicator which rotates beneath the shoes causing various electrodes 161 to be energized via their associated pads 120 as they pass beneath those shoes 23 which have energizing potentials thereon.

The back plate 104 of the indicator includes an electrode assembly on its inner surface adapted to cooperate with the electrode assembly on the inner surface of front plate 103. These electrodes, 164 are connected to contact pads 121 on the exterior surface of the back plate which provide electrical connection between the various electrodes 164 and a plurality of shoes 223 similar to shoes 23 of FIG. 3. The shoes 223 associated with the back plate are relatively stationary with respect to the indicator and provide selective electrical potentials to various electrodes 164 via their contact pads 121 as the back plate rotates by the stationary shoes. The electrodes 164 may be in the form of electrodes 64 of FIG. 8 or any of the various electrode assembly configurations previously described.

When the low voltage embodiment is utilized in practicing this invention, a front or back plate of the rotatable indicator assembly may be fabricated using any of the techniques previously described for the front or rear electrode assemblies and electrical signals are coupled to shoes 123 and 223 by conductors 124 and 224 which are similar to conductors 26 previously described.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A relative azimuth indication system, comprising: an indicator, including:
   an image area optically responsive to an electric field, a first electrode assembly adjacent to the viewing side of said indicator, a second electrode assembly adjacent to the rear side of said indicator, said first and second electrode assemblies adapted to generate an electric field at selected points therebetween and through said indicator image area;
   a first contact assembly including a plurality of electrical brushes for coupling electrical potentials to said first electrode assembly; a second contact assembly for coupling electrical potentials to said second electrode assembly; and means to rotate said indicator including said first and second electrode assemblies relative to at least one of said contact assemblies.

2. A relative azimuth indication system as defined in claim 1, wherein said means to rotate said indicator comprises:
   a means responsive to the earths magnetic field and adapted to rotate said indicator in accordance with relative magnetic heading.

3. A relative azimuth indication system as defined in claim 1 wherein said means to rotate said indicator comprises: a selsyn receiver including a drive shaft adapted to support said indicator;
   a selsyn transmitter electrically coupled to said selsyn receiver; and
   a means responsive to the earths magnetic field and adapted to rotate said selsyn transmitter in response thereto.

4. A relative azimuth indication system as defined in claim 3, wherein said means responsive to the earths magnetic field is a gyroscopically stabilized flux gate magnetic sensor.

5. A relative azimuth indication system as defined in claim 3, wherein said means responsive to the earths magnetic field is a gyrosyn compass.

6. A relative azimuth indication system as defined in claim 1, wherein said means to rotate said indicator comprises a gyro compass.

7. A relative azimuth indication system as defined in claim 1, wherein said means to rotate said indicator comprises:
   a gyroscope;
   a means to support said gyroscope in a plane essentially parallel to a plane tangent to the surface of the earth and permit 360 degrees of rotation abount an axis perpendicular to said plane; and coupling means adapted to rotate said indicator as a function of the relative rotation between said gyroscope and said support means about said perpendicular axis.

8. A relative azimuth indication system as defined in claim 1, wherein said indicator comprises:
a front plate including said first electrode assembly;
a back plate including said second electrode assembly;
said front and back plates secured together to form a sandwich like structure forming an image area defining a void between said front and back plates with said first and second electrode assemblies having surfaces spaced apart from each other and within said image area void;
an optically responsive medium contained in said void; and
means to seal the peripheral edges of said front and back plates to contain said optically responsive medium within said void.

9. A relative azimuth indication system as defined in claim 8, wherein at least one of said plates is fabricated from a transparent dielectric material.

10. A relative azimuth indication system as defined in claim 9, wherein said optically responsive medium comprises a nematic liquid crystal.

11. A relative azimuth indication system as defined in claim 9, wherein said optically responsive medium comprises a cholesteric liquid crystal.

12. A relative azimuth indication system as defined in claim 9, wherein said optically responsive medium comprises:
a nematic liquid crystal; and
a cholesteric liquid crystal.

13. A relative azimuth indication system as defined in claim 12, wherein said nematic and cholestric liquid crystals are provided in a ratio which will provide an image retention within a range from 30 seconds to 2 minutes.

14. A relative azimuth indication system as defined in claim 9, wherein said optically responsive medium comprises:
at least one nematic liquid crystal compound of the formula X CH=N N wherein X and Y are selected from the group consisting of alkoxy radicals and acyloxy radicals, said alkoxy radicals having from one to nine carbon atoms and said acyloxy radicals having from two to five carbon atoms, with the proviso that X and Y are different, and when said acyloxy radical has only two carbon atoms, said alkoxy radical has at least three carbon atoms with at least one member of the group consisting of cholesterol derivatives.

15. A relative azimuth indication system as defined in claim 9, wherein said first electrode assembly comprises: a transparent conductive member dimensioned to encompass said image area void of said indicator.

16. A relative azimuth indication system as defined in claim 15, wherein said transparent conductive member is affixed to the surface of said front plate forming half of said image area void.

17. A relative azmuth indication system as defined in claim 16, further including electrical conductive contact means affixed to the side of said front plate opposite said void and forming an electrical circuit between said first electrode assembly and said first contact assembly.

18. A relative azmuth indication system as defined in claim 17, wherein said transparent electrode comprises a plurality of parallel conductors electrically isolated from each other.

19. A relative azimuth indication system as defined in claim 17, wherein said transparent electrode comprises a plurality of concentric conductors forming circles of increasing diameter starting from a point essentially at the center of said image area and electrically isolated from each other.

20. A relative azmuth indication system as defined in claim 17, wherein said transparent electrode comprises a plurality of electrically isolated conductors equally spaced and radiating outward from the center of the image area of said indicator.

21. A relative azimuth indication system as defined in claim 9, wherein said back plate comprises:
a dielectric substrate; and
said second electrode assembly comprises a plurality of electrodes electrically isolated from each other supported by and passing through said dielectric substrate to present a plurality of point source electrodes essentially blanketing said image area of said indicator.

22. A relative azimuth indication system as defined in claim 9, wherein said second electrode assembly comprises:
a transparent conductive member dimensioned to encompass said image area void of said indicator.

23. A relative azimuth indication system as defined in claim 22, wherein said transparent conductive member is affixed to the surface of said back plate forming half of said image area void.

24. A relative azimuth indication system as defined in claim 23, further including electrical conductive contact means affixed to the side of said back plate opposite said void and forming an electrical circuit between said second electrode assembly and said second contact assembly.

25. A relative azimuth indication system as defined in claim 24, wherein said transparent electrode comprises a plurality of parallel conductors electrically isolated from each other.

26. A relative azimuth indication system as defined in claim 24, wherein said transparent electrode comprises a plurality of concentric conductors forming circles of increasing diameter starting from a point essentially at the center of said image area and electrically isolated from each other.

27. A relative azimuth indication system as defined in claim 24, wherein said transparent electrode comprises a plurality of electrically isolated conductors equally spaced and radiating outward from the center of the image area of said indicator.

28. A relative azimuth indication system as defined in claim 9 further comprising an insulated conductive member dimensioned to encompass said image area forming void of said indicator.

29. A relative azimuth indication system as defined in claim 28, comprising means to selectively energize said insulated conductive member.

30. A relative azimuth indicator as defined in claim 9, wherein said optically responsive medium comprises:
a plurality of minute, oblong particles responsive to an electric field; and
a liquid medium adapted to suspend said minute, oblong particles.

31. A relative azimuth indicator as defined in claim 30, further including a means to heat said liquid medium to change its viscosity.

32. A relative azimuth indicator as defined in claim 9, wherein said optically responsive medium comprises:
a suspending medium; and
a plurality of minute particles rotatably carried in said medium, said particles having at least one dimension of the order of $\lambda/2\eta$ and at least one other dimension not exceeding $\lambda/10\eta$, where $\lambda$ is the wavelength of light and $\lambda$ is the index of refraction of the suspending medium.

33. A relative azimuth indicator as defined in claim 32, further including a means to heat said suspending medium to change its viscosity.

34. A relative azimuth indicator system as defined in claim 1, further comprising:
a directional radio receiver;
a band pass filter means responsive to signals detected by said radio receiver and adapted to pass signals representing lightning generated static signals;
a first analog-to-digital converter adapted to convert said signals passed by said band pass filter into range pulses representing the distance between the origin of said lightning generated static signals and said radio receiver;
a second analog-to-digital converter adapted to convert the analog azimuth data representing signals received by said directional radio receiver into azimuth pulses representing the relative bearing of the source of said signals; and
means to selectively couple said range and azimuth pulses to different ones of said electrode assemblies.

35. A relative azimuth indicator system as defined in claim 34, further comprising:
means to convert the analog azimuth signal output of a visual omni range navigational receiver converter to azimuth pulses representing magnetic bearing to the source of signals.

36. A relative azimuth indicator system as defined in claim 1, further comprising:
a directional radio receiver;
a band pass filter means responsive to signals detected by said radio receiver and adapted to pass signals representing lightning generated static signals;
a first analog-to-digital converter adapted to convert said signals passed by said band pass filter into range pulses representing the distance between the origin of said lightning generated static signals and said radio receiver;
a second analog-to-digital converter adapted to convert the analog azimuth data representing signals received by said directional radio receiver into azimuth pulses representing the relative bearing of the source of said signals;
said first electrode assembly comprises a plurality of transparent concentric conductors forming circles of increasing diameter starting from a point essentially at the center of said image area;
means to couple said range pulses to said individual first electrode concentric conductors;
said second electrode assembly comprises a plurality of equally spaced conductors electrically isolated from each other and radiating outward from the center of said image area; and
means to couple said azimuth pulses to said individual second electrode conductors.

37. A relative azimuth indicator system as defined in claim 36, wherein said indicator comprises:
a nematic liquid crystal and a cholesteric liquid crystal.

38. A relative azimuth indicator system as defined in claim 36, wherein said indicator comprises:
a suspending medium;
a plurality of minute particles rotatably carried in said medium, said particles having at least one dimension of the order of $\lambda/2\eta$ and at least one other dimension not exceeding $\lambda/10\eta$ where $\lambda$ is the wavelength of light and $\eta$ is the index of refraction of the suspending medium.

39. A relative azimuth indicator system as defined in claim 37, further comprising:
a source of electrical potential;
said first electrode assembly further comprising an insulated transparent conductive member dimensioned to encompass the image area of said indicator;
said second electrode assembly further comprising an insulated conductive member dimensioned to encompass the image area of said indicator; and
means to connect said electrical potential across said transparent conductive member and said conductive member to erase any image retained on said indicator.

40. A relative azimuth indicator system as defined in claim 38, further comprising:
a source of electrical potential;
said first electrode assembly further comprising an insulated transparent conductive member dimensioned to encompass the image area of said indicator;
said second electrode assembly further comprising an insulated conductive member dimensioned to encompass the image area of said indicator; and
means to connect said electrical potential across said transparent conductive member and said conductive member to erase any image retained on said indicator.

41. A relative azimuth indicator system as defined in claim 39, further comprising:
means to convert the analog azimuth signal output of a visual omni range navigational receiver converter to azimuth pulses representing magnetic bearing to the source of signals.

42. A relative azimuth indicator system as defined in claim 40, further comprising:
a means to heat said liquid medium to change its viscosity.

* * * * *